(12) United States Patent
Berkowitz et al.

(10) Patent No.: US 8,737,813 B2
(45) Date of Patent: May 27, 2014

(54) AUTOMATIC CONTENT RECOGNITION SYSTEM AND METHOD FOR PROVIDING SUPPLEMENTARY CONTENT

(75) Inventors: Daniel Berkowitz, New York, NY (US); Scott Wolynski, Brooklyn, NY (US); Myra Einstein, New York, NY (US); Matthew McKenna, Rahway, NJ (US); Arturo Vermolen, Long Island City, NY (US); Christopher J. Falkner, Hoboken, NJ (US)

(73) Assignee: NBCUniversal Media, LLC, New York, NY (US)

( * ) Notice: Subject to any disclaimer, the term of this patent is extended or adjusted under 35 U.S.C. 154(b) by 61 days.

(21) Appl. No.: 13/335,337

(22) Filed: Dec. 22, 2011

(65) Prior Publication Data

US 2013/0071090 A1 Mar. 21, 2013

Related U.S. Application Data

(60) Provisional application No. 61/535,842, filed on Sep. 16, 2011.

(51) Int. Cl.
*H04N 5/92* (2006.01)
*H04N 5/93* (2006.01)

(52) U.S. Cl.
USPC .......................................... 386/248; 386/239

(58) Field of Classification Search
USPC .......................... 386/248, 239, 240, 241, 249
See application file for complete search history.

(56) References Cited

U.S. PATENT DOCUMENTS

2002/0162118 A1   10/2002   Levy et al.
2007/0113264 A1*   5/2007   Rothschild ..................... 725/135
2010/0005501 A1    1/2010   Stokking et al.

* cited by examiner

*Primary Examiner* — Robert Chevalier
(74) *Attorney, Agent, or Firm* — Fletcher Yoder, P.C.

(57) ABSTRACT

Primary digital content played on a media device, such as a television, handheld device, smart phone, computer, or other device, is sampled and data is derived from the sample for identification of the primary digital content. Automatic content recognition is performed to determine the primary digital content. The time of the sample may also be determined. Supplementary digital content is then selected and transmitted to the media device, or to another device, based upon the identified primary digital content. The supplementary digital content may be adapted in layout, type, length, or other manners, based upon the platform and/or configuration of the media device or any other device to which the supplementary digital content is transmitted.

32 Claims, 5 Drawing Sheets

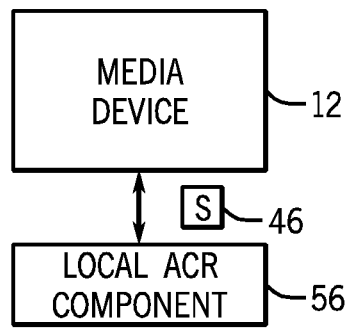
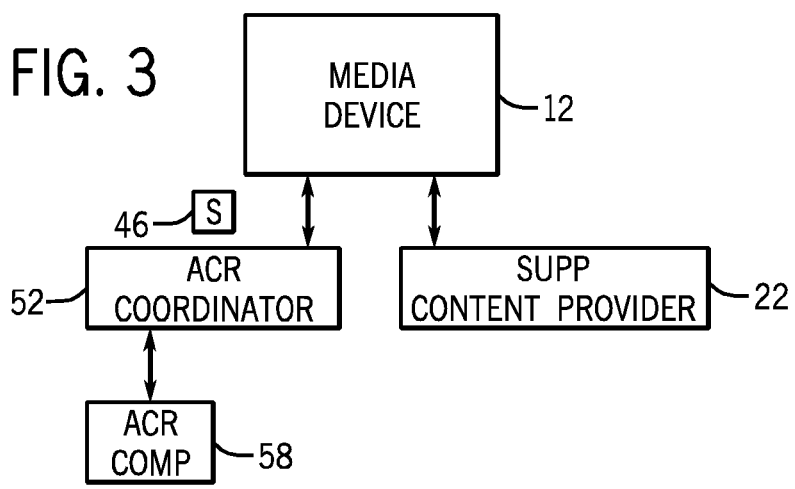
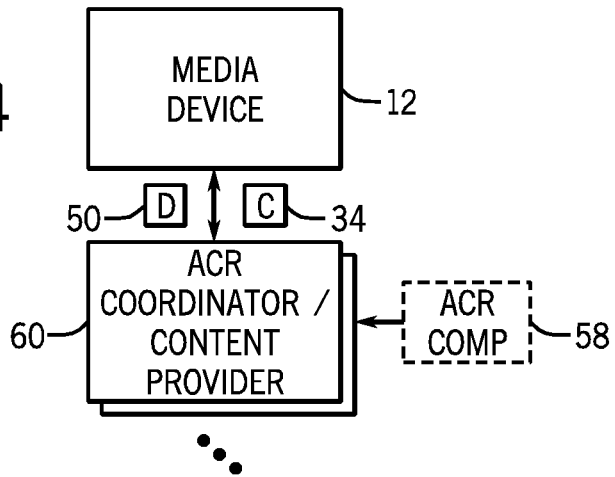

AUTOMATIC CONTENT RECOGNITION SYSTEM AND METHOD FOR PROVIDING SUPPLEMENTARY CONTENT

CROSS-REFERENCE TO RELATED APPLICATIONS

This application claims priority to U.S. Provisional Application No. 61/535,842, filed Sep. 16, 2011, which is incorporated herein by reference in its entirety for all purposes.

BACKGROUND

The present invention relates generally to the field of digital content for the delivery of video, audio and multi-media content, and more particularly to innovations for the delivery of supplementary content that may be of interest to a receiver of a primary content.

The field of digital-content delivery has undergone very substantial changes in recent years. Traditional media included, for example, broadcast television, cinema, physical supports for audio recording and playback, and so forth. These industries have been revolutionized by the ability to store, transmit, deliver and play back content of interest to wider ranges of audiences by digital means. Current technologies include, for example, traditional broadcast technologies, satellite transmission, cable delivery systems, cellular transmission systems, Internet delivery systems, as well as a range of physical memory supports for receiving, storing and playing back content. An area of increasing interest in the field relates to the ability to provide additional or supplementary information and content based upon a primary content that is transmitted, stored or played back on a device, such as a television, handheld device, computer, smart phone, and so forth.

One challenge in the delivery of such supplementary content is ensuring that the supplementary content is related in some meaningful way to the primary content being enjoyed by the users. For example, systems have been developed in which users may, at their own initiation, request additional content, such as while viewing a scheduled television broadcast. The additional content may be requested, for example, by calling a telephone number or visiting a website that appears on the television screen. Other techniques have involve, for example, determining a channel that is currently tuned on a receiver, such as the television, and providing content based upon such knowledge and knowledge of scheduled programming on the channel. Still further, techniques have been developed for delivering content such as advertising, offers and promotions, to audiences that may be interested based upon service subscription, geographical locations, demographic markets, and so forth.

However, the present techniques do not offer a flexible system that can adapt to a wide range of content that may be currently enjoyed by target audiences. In particular, while scheduled broadcasts and programming may be known, by increasingly users make use and draw content from an increasingly wide range of sources, on an increasingly wide range of device platforms and device types, and much of the content is not enjoyed during a known programming schedule.

There is a need, therefore, for improved systems that can accommodate the great variety of sources of primary content, and provide supplementary content that may be of interest to users based upon the primary content. There is a particular need for a system that can perform these functions independent of whether the primary content is currently received or time-shifted, or even stored locally or remotely from the playback device.

BRIEF DESCRIPTION

The present invention provides novel techniques for primary and supplementary content delivery designed to respond to such needs. For example, the technique may be used with many different electronic playback devices, such as televisions, television systems, multi-media systems, audio playback devices, computers, hand-held devices, and so forth. The techniques offered by the invention also allow for complete or virtually complete independence from the source and time of the primary content. Various types of supplementary content may be provided, such as content that may compliment or work closely with the primary content (e.g., audio content intended to be played back with video content), information that may of interest related to the primary content, offers and promotions for products and services that may be related to the primary content, or any other information, surveys, polls, or information that may of interest to an audience based upon knowledge of the primary content then being played back.

DRAWINGS

These and other features, aspects, and advantages of the present invention will become better understood when the following detailed description is read with reference to the accompanying drawings in which like characters represent like parts throughout the drawings, wherein:

FIG. 2 is a simplified diagrammatical representation of a variant of the system of FIG. 1;

FIG. 3 is a simplified diagrammatical representation of another variant of the system;

FIG. 4 is a further diagrammatical representation of a variant of the system;

DETAILED DESCRIPTION

Figure 1:
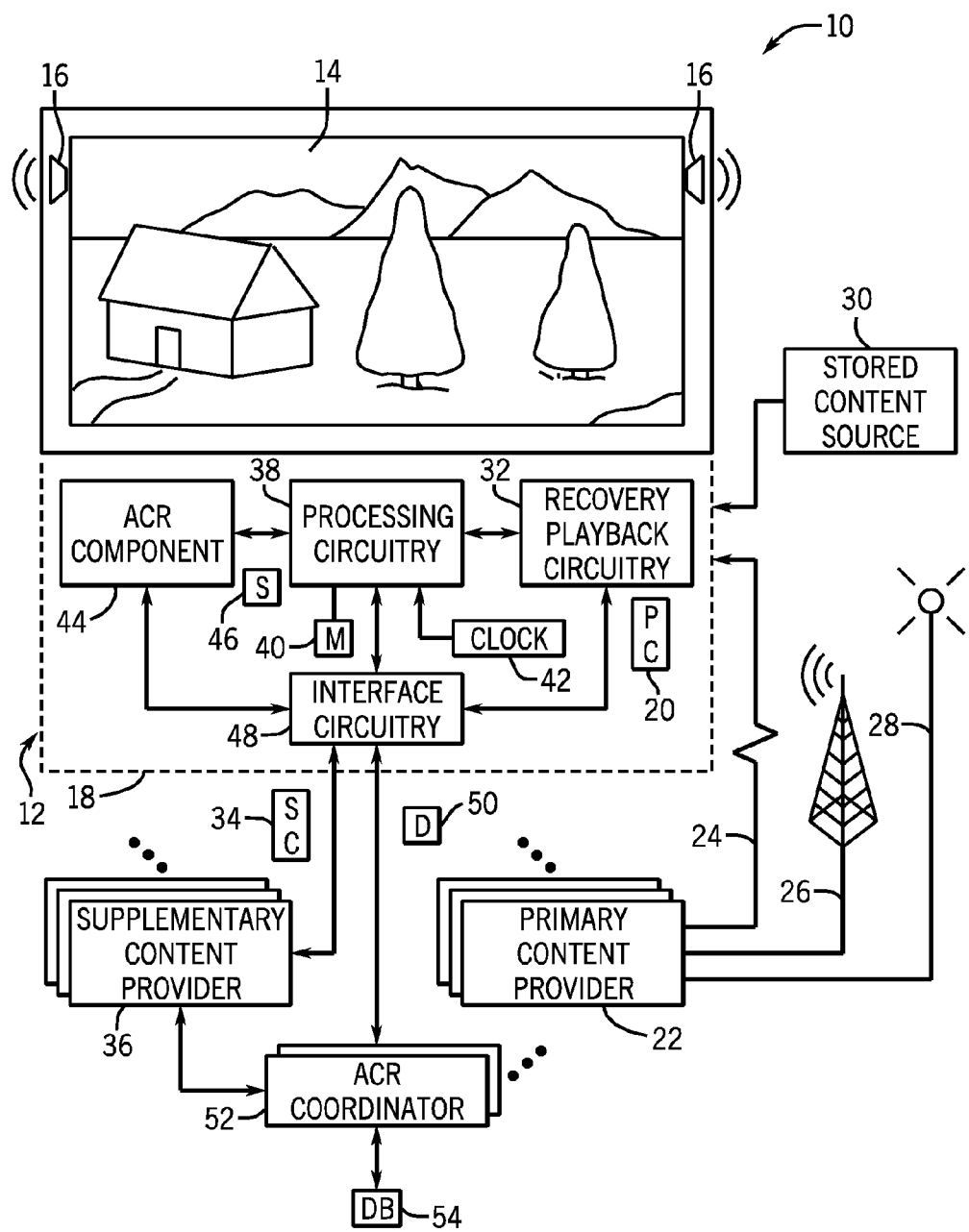
FIG. 1 is a diagrammatical representation of a content delivery system incorporating aspects of the present techniques.

Turning now to the drawings, FIG. 1 represents a content delivery system 10 while providing primary content and supplementary content that may be of interest to an audience. The system includes a media device 12 that maybe adapted for playing video, audio, or multi-media content. In practice, the media device 12 may be a television set, a collection of components including a television set, a computer with monitor, an audio-only playback system, a hand-held device, a smart phone or any other media device to which digital content is delivered and used by a user or a target audience. In the illustrated embodiment, the media device 12 includes a monitor 14 for providing still or moving pictures based upon the received content, as well as speakers 16 for providing audio output.

The illustrated media device 12 also includes a data processing system represented generally by reference numeral 18. The processing system may include multiple components as illustrated and described herein, or in certain embodiments such components may be provided in separate devices that are used in conjunction with the media device, although all these are generally taken into account in the use of the term media device in the present context. The data processing system 18 is designed to receive primary content 20 from one or more primary content providers 22. Again, this primary content may include video, audio, multi-media, text, or any other desired digital content. The primary content providers, in turn, may include television broadcast companies, cable providers, satellite programming providers, Internet-based content providers, radio stations, or any other providers of digital content. Moreover, in the illustrated embodiment any one of a range of technologies may be used for delivering the primary content to the media device. In the illustrated embodiment these include cable links 24, such as for cable television, Internet communications, and so forth, broadcast technologies as indicated by reference numeral 26, and satellite transmission technology as indicated by reference numeral 28. Other technologies may, of course, be employed, including cellular technologies, various wireless technologies, and so forth. It should also be noted, that the media device may receive the primary content from a wide range of other components, as indicated by reference numeral 30. These components may include stored content sources, such as disk readers, solid state memory, cloud computing services, third-party storage and/or playback systems, and so forth. In general, all of these sources may be capable of providing the primary content that is played by the media device at a known or unknown time. That is, some of the content may be scheduled, such as television programming, while other content may be viewed at a time that is shifted from a broadcast time slot, or even that corresponds to no particular schedule at all, such as in the case of delayed playback, playback of stored content, and so forth.

The data processing system 18, as described more fully below, is designed to allow for identification of played content as it is played, regardless of the source of the content. Thus, not only may the system access and play the content itself, but the content may be freely identified in accordance with automatic content recognition techniques and the identification of the content based upon these techniques may be used to provide additional or supplementary content that may be of interest to the receiving audience.

Thus, the data processing system 18 will comprise receivers/playback circuitry 32 that receive the primary content 20 from one of the content sources and play back the content in accordance with generally known reproduction and playback techniques. Supplementary content 34 is then provided based upon the primary content. Such supplementary content will originate in one or more supplementary content providers 36 which, in many practical applications may overlap with the primary content providers 22, or these may be separate entities. In certain presently contemplated embodiments, the supplementary content may be intended to directly compliment the primary content, such as in the case of music, foreign language audio, or other content which is intended directly to be played simultaneously with the primary content. In other cases the supplementary content may be somewhat loosely linked to the primary content, such as to provide details regarding the primary content, additional information regarding plots, characters, actors, and the like, offers for additional information that may be of interest, sports scores and statistics, stock prices, product and service offerings, just to mention a few. In other contexts, the supplementary content may simply be directed to the target audience based upon selection of the primary content type, as indicated by a geographic location of playback, a demographic drivable from the primary content or other information stored on the media device 12 or known about the audience, and so forth.

The data processing system 18 further includes processing circuitry 38 which in most cases will include some type of microprocessor, digital signal processor, or the like. The processing circuitry performs functions, many of which may be beyond the scope of the present description, including control of video, control of audio, implementation of coding and decoding schemes used by the receiver/playback circuitry, and so forth. The processing circuitry 38 may include, or separate memory circuitry may be provided as indicated by reference numeral 40. Moreover, the processing circuitry 38 may include, or a separate clock may be provided as indicated by reference numeral 42. As described more fully below, the clock may be consulted at various times during playing of the primary content and/or the supplementary content in order to synchronize these with one another to a degree desired.

As indicated at reference numeral 44 in FIG. 1, the processing circuitry further includes an automatic content recognition (ACR) component. This component, in fact, include circuitry designed to sample and hold signals corresponding to video, audio, text, or any other aspects of the content that is played by the media device. In practical implementations, the ACR component 44 may include, for example, sampling circuitry that works in cooperation with the processing circuitry 38. The ACR component may also comprise algorithms that are executed by the processing circuitry 38 to recognize the primary content based upon a sample 44 extracted from the primary content stored and/or played on the media device. In a presently contemplated embodiment, the sample 46 is detected at any desired time, and the clock 42 is consulted to note the sample time as described in more detail below. The ACR component, whether in hardware, software, firmware or any combination of these, serves to extract sufficient data from the sample to permit identification of the primary content. Any known technology for such automatic content recognition may be employed, such as recognition of an embedded watermark in the primary content, derivation of a "fingerprint" from the data defining the primary content, and so forth. In general, however, it is presently contemplated that the ACR technique employed will be affective on the sample 46 taken at a particular instant in time such that, where desired, synchronization of the supplementary content may be performed based upon the time at which the sample is taken.

The data processing system 18 is designed to operate with external devices through interface circuitry 48. Such circuitry may be based upon any desired technology and protocols, such as Internet protocols, wireless protocols, telephony protocols, and so forth. As illustrated in FIG. 1, the interface circuitry may receive the supplementary content 34 from one or more of the supplementary content providers 36. However, it is also presently contemplated that data 50 indicative of the identity of the primary content as derived from the sample 46 may be transmitted by the interface 48 to one or more ACR coordinators 52. In the topography illustrated in FIG. 1, the data 50 represents the unique identifying watermark, signature, or any other unique data that is extracted from or derived from the sample 46. This data 50, transmitted to the ACR coordinator 52, may be used by the ACR coordinator to identify the primary content 20 by consultation of one or more databases 54. In a presently contemplated embodiment, the ACR coordinator 52 has access to a wide range of content, and based upon the received data may identify not only the primary content but the point in the primary content at which the sample 46 was taken. As described more fully below, this identification may be used by the one or more supplementary providers 36 to provide the supplementary content which, based upon the identification may be adapted to the primary content. Here again, it should be borne in mind that other factors may be used for selection of the supplementary content, including any known information about the media device, the target audience, locations and demographics of the audience, subscriptions on the audience, other stored information on the media device, and so forth.

In the embodiment illustrated in FIG. 1, the supplementary content provider 36 is illustrated as separate from the primary content provider 22, and the supplementary content 34 is illustrated as being provided separately from the primary content 20. Other scenarios are possible and presently envisage as well. For example, in some embodiments, the supplementary content may be provided with the primary content, including by one or more primary content providers, and the technologies used for transmitting the primary content. In such scenarios, the supplementary content provider may be the same entity as the primary content provider or a link between the supplementary content provider and the primary content provider may be provided, such as to allow the supplementary content provider to "piggyback" the supplementary content with the primary content.

Still further, protocols and techniques for integrating the supplementary content with the primary content may include rich and varied approaches, as may the software and hardware that permit such integration. By way of example, protocols and schemes described below may be used to adapt the supplementary content to the particular media device, media device manufacturers, media device capabilities, or even positions of the media device, such as in the case of smart phones held in one position or another position. The particular configuration of the media device may be taken into account when providing or adapting supplementary content. To facilitate such adaptability, various software schemes may be used, including the use of applications executed by the processing circuitry 38 and adapted specifically for various hardware platforms and device manufacturers. Such techniques are described, for example, in U.S. Patent Application Ser. No. 61/502,256, filed on Jun. 28, 2011, entitled "Application Structure for Web-enabled Computer Electronics Device", which is here incorporated by reference.

FIG. 2 illustrates a variant of the design illustrated in FIG. 1 in which the internal ACR component 44 of the embodiment of FIG. 1 is provided externally. In this embodiment, the ACR component 56 is linked to the media device 12, but may be provided in a separate component (e.g., a set-top box) and configured to receive the sample 46 and to perform the extraction of identifying data based upon the desired ACR technique. FIG. 3 illustrates a similar variant in which the ACR component 58 is remote from the media device 12, and may be associated, for example, with the ACR coordinator 52. In this approach, the sample 46 is taken by the media device, and communicated to the ACR coordinator 52. The sample is then used to identify the primary content and the location of the sample in the primary content by an ACR component 58 employed by the ACR coordinator. FIG. 4 illustrates a further alternative in which the ACR coordinator and the content provider are merged as indicated at reference numeral 60. In such embodiments, the data 50 may be provided to the ACR coordinator/content provider 60 and the supplementary content 34 may then be sent back to the media device. In this embodiment as well, the alternative of FIG. 3 may be employed, in which an ACR component 58 is used by the ACR coordinator/content provider 60 and rather than data 50, the media device may provide a sample of the primary content which can be identified based upon the ACR component 58.

Figure 5:
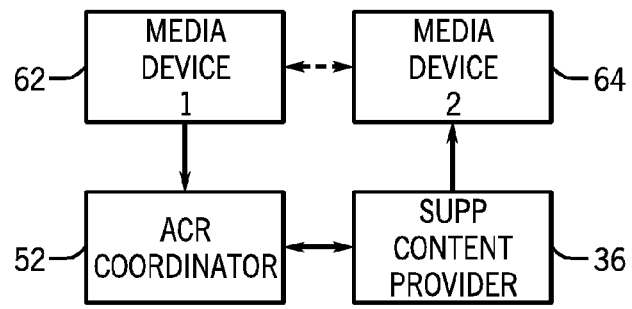
FIG. 5 is a diagrammatical representation of a variant of the system in which more than one media device is served with a primary and/or supplementary content.

It is also contemplated that the present techniques may be used in situations where more than one media device is used by a single user or audience. FIG. 5 is a simplified diagram illustrating one such scenario. As illustrated in FIG. 5, a first media device 62 is available for receiving primary content as described above. A second media device 64 is also available to the user or audience. These two devices may communicate with one another, such as through wireless protocols. In a presently contemplated embodiment, for example, the first media device 62 may be a web-enabled television while the second media device 64 may be a computer, hand-held device, tablet computer, smart phone, or the like. In such arrangements, primary content played on media device one may be identified as described above, in cooperation with an ACR coordinator. Supplementary content, then, may be provided by a supplementary content provider 36 to the second media device 64. As will be apparent to those skilled in the art, many such combinations may be envisaged, and any of the variants outlined above may be employed with one or more of the media devices. Such arrangements may allow for providing information and data of interest to audiences who enjoy primary content on the first media device, such as through formatting specifically designed for the second media device. As also discussed below, the present techniques contemplate adapting the supplementary content to the particular device to which it is sent and played, allowing for a second media device 64 to receive the supplementary content in a different form, in a different layout, in expanded or abbreviated text, or any other manner adapted to the particular secondary media device, its hardware platform, its configuration, and so forth.

For example, the supplementary content 34 may be provided in the form of timeline information with one or more pieces of content to be played by a client (e.g., the media device 12). The timeline may include meta-data such as: a start time of the timeline, a duration of the timeline, a time that the timeline was last modified, an alphanumeric identifier for the timeline, the primary content with which the timeline is associated with, the target type of playback device for the timeline (e.g., a television, computer, smartphone, etc.). Further, for each piece of supplemental content in the timeline, the timeline may include a cue describing when the associated piece of supplemental content should be played. The cue may include: a time, relative to the start of the primary content, when the piece of supplemental content should be played; any transitions, including type (e.g., fade, wipe, or none) and duration (e.g., 5 second), that may provide a segue into the supplemental content; a duration of the cue (e.g., how long the supplemental content will be actively played); a type of cue, describing if the cue should automatically replace another already existing cue or require a user to replace the already existing cue (e.g., via user interaction with the client); an exit-prompt, detailing whether a user should be prompted before an already active cue is replaced with a new cue in the timeline; and a group of supplemental content objects associated with the cue.

The group of supplemental content objects may include objects set forth in a standard template library of objects useful for generating display templates for the client. For example, a base set of objects may include a text object, a text style object, an image object, and/or a story object. The text object may include numerous versions (e.g. short, medium, and long) that enable different versions of text to be offered for different clients. For example, it may be desirable for smaller screened devices, such as smartphone clients, to receive less supplemental text than larger display clients. Thus, the smartphone client may make use of a short version of the text object, while the larger screened device may make use of the medium or long version of the text object. The text object may also include other features such as introduction animations, conclusory animations, or a steady animation to apply to the text contained in the text object. Further, each version of the text (e.g., short, medium, and long) in the text object may include an individual style. The style may be defined by a text style object that defines attributes of the text, such as size, shape, color, boldness, etc.

Further, the standard library may contain an image object. Similar to the text object, the image object may include multiple versions of an image (e.g., small, medium, and large), useful for different sized devices. For each version of the image, a separate universal resource locator (URL) may be provided to locate the specific version of the image. Further, as discussed above with regards to the text object, each version of the image in the image object may be associated with a particular image style object that defines attributes of the associated image version (e.g., a level of translucence, etc.) and the image object may include animation settings.

In some embodiments, the supplemental content may include a large block of text. The standard library may include a story object that provides for providing the large block of text to the client. The story object may include the large block of text, along with an associated style (e.g., font type, size, color, etc.). Additionally, the story object may include a teaser, or brief description of the large block of text along with an associated style. Further, the story object may include a navigation element detailing how the large block of text should be displayed (e.g., scrollable or paginated) if it is multi-paged. Further, as discussed above, with regards to the text and image objects, the story object may also include animation settings.

The standard library may also include more complex objects that build upon a basic set of objects. One example may be a video object. Similar to the other objects, the video object may provide separate versions of one or more videos (e.g., small, medium, and large) such that differently configured devices may make use of differently sized videos (e.g., low-bandwidth devices may make use of the small video). Each version of the video may include a thumbnail reference and caption, such that a user may be provided a preview of the video. Further, the video object may include meta data such as an alphanumeric identifier, a last modified date, a type, etc. The video object may build upon other basic objects. For example, the video object may include a layout object, that defines the layout for the video, a bookmark object, which keeps track of the current position in the video such that a user who leaves the video can resume playback where they left off, and a share object that allows a user to share the video with others.

An audio object may also be included in the standard library. The audio object may include multiple versions of an audio file, such that differently configured devices may make use of different versions of the audio file (e.g., a low-bandwidth device may make use of a small version of the audio file). Further, messages may be associated with the audio object, the messages providing text and/or images associated with the audio object). As with the video object, the audio object may include a layout object, bookmark object and a share object. The layout object defines the layout for the audio, the bookmark object keeps track of the current position of the audio file, and the share object allows a user to share the audio with others.

The supplemental content provider may make use of each of the objects in the standard library (along with custom content-provider specific instructions and content) to generate supplemental content. For example, the supplemental content may include a story, with associated video and audio objects. The supplemental content provider may configure instances of the objects, associate them with cues and insert the cues into a timeline associated with a particular piece of primary content.

Figure 6:
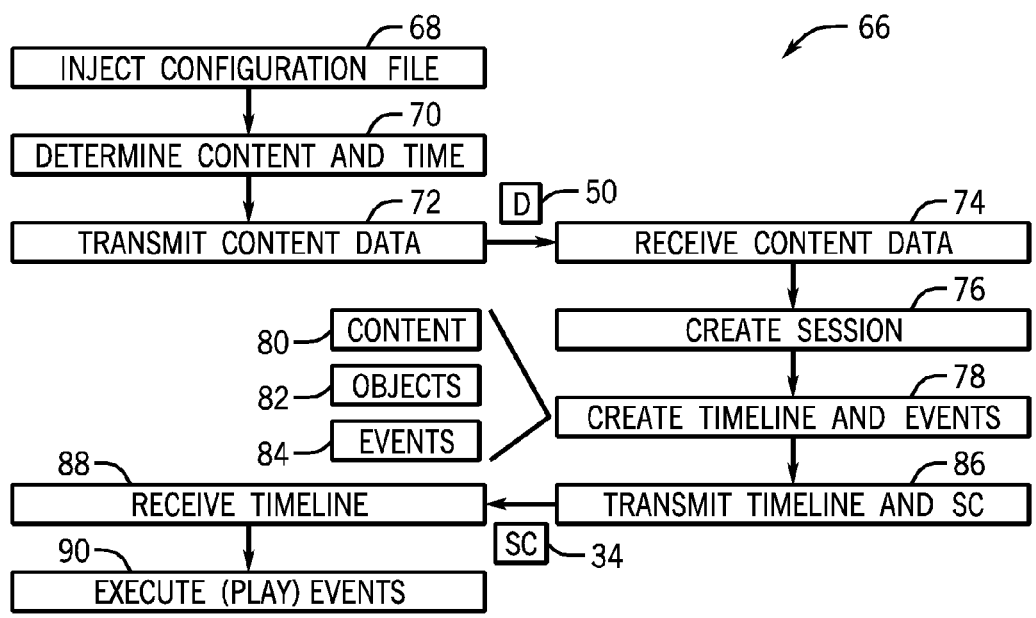
FIG. 6 is a diagrammatical representation of a data provision process for transmitting supplementary content based upon identification of primary content.

Turning now to a discussion of how the timeline information is used for supplemental content feedback, FIG. 6 is a flowchart illustrating a process 66 for playing supplementary content (e.g., text, images, video and/or audio) on a client (e.g., the media device 12). A sample of content from the client may be taken and content data 50 (e.g., the content, media time of the content (e.g., a playback time specific to the content), and a supplemental content URL) may be determined based upon the sample (block 68). Based upon the determined media content, the client may receive and be loaded with a configuration file (block 70) from an external server. The configuration file provides the client with basic information that allows the client to function as a player for supplementary content. For example, the configuration file may include information relating to the primary content that is available, configuration information relating to playing the supplementary content, and/or configuration information that enables the client to connect to external servers (e.g., ACR coordinator 52 and/or supplementary content provider 36). In one embodiment, the primary content information may include a list of available shows. The list may include the name of the show, an identification number associated with the show, the network providing the show, a feed identifier (e.g., live, U.S. Eastern Time, U.S. Mountain Time, U.S. Pacific Time), and/or the country that the show is being provided in (e.g., U.S.A. and/or Canada). Further, the configuration file may provide settings as to how any supplementary content received should be played. For example, in certain embodiments, the configuration file may provide configuration settings (e.g., size, color, etc.) for the various types of supplementary content that may be received (e.g., text and/or images). Further, the configuration file may include configuration information for a default frequency for how often supplementary content may be played on the client as well as how long the supplementary content should be played for. Additionally, in certain embodiments, the external server connection settings may include a list of servers with one or more IP addresses associated with the servers. Additionally, when the client is configured to connect to load balancers, the external server connection settings may include a list of the load balancers and their associated IP addresses. From time to time, connection between the client and external servers may fail. In certain embodiments, the configuration file may include configuration settings relating to connection retry attempts. For example, the configuration file may include a wait-time setting that provides a time to wait before trying to reconnect. The configuration file may also include a wait-time message associated with the wait-time that notifies a user of the client that the connection failed but will be retried. A multiplier setting may cause the wait time to increase with successive attempts (e.g., when the multiplier is set to 2, the wait time may increase by a multiple of two, before attempting to reconnect). The configuration file may also include a configuration setting that provides the maximum number of connection retry attempts before requesting that the client user contact customer support.

The content data 50 is transmitted (block 72) to an external server (e.g., supplementary content provider 36), which receives the content data 50 (block 74). Upon determining that the client is providing a new request for supplementary data, the external server may optionally create a session (block 76) for the communications between the client and the external server. When a session is created, the client may provide an identifier of the primary content as well as a media time describing the current playback time of the media. Based upon this provided session data, the external server may generate a session id representative of the session, update the configuration file, and/or create a timeline with supplementary content and/or events (block 78) based upon on the content data 50.

The timeline may be a set of supplemental content for a specific piece of primary content. The set of supplemental content may contain poll calls to action, poll answers, e-commerce transactions, Advertising elements served from a Ad Decision System, messages to be displayed to the user, trivia questions, fantasy games, biographical or statistical information about actors or athletes, show background information, and other meta data associated with the primary content.

When a session is not created, the client may provide the server with a request to receive a timeline for the primary content by providing an identifier of the primary content as well as a media time describing the current playback time of the media. Based upon the request, the server may update the configuration file and/or provide a timeline for supplemental content.

Based upon the request by the client to create a session and/or get a timeline based upon the primary content, the server may provide a command to the client to update the configuration file discussed above. The update command may include modifications to and of the configuration file fields.

Further, as discussed above, the server may create a timeline of supplemental content based upon the primary content identifier provided in the session request or the get timeline request. To create the timeline, the external server may gather content 80 that includes objects 82 and/or events 84 associated with the content data 50. The timeline provides a media time when each piece of content 80 should be played. The timeline may also include a duration of time that the content should be played, any transitions that should be implemented, a target-screen time for the content, etc.

Once the timeline is created, the timeline with the supplementary content 34 is transmitted (block 86) back to the client, where it received (block 88). The client plays the supplementary content 32 (e.g., content 80, objects 82 and/or events 84) (block 90) based upon the information provided in the timeline and the provided supplementary content 34.

To play the content, the client may continually receive a media time describing the current playback location in reference to the primary content. As described above, the media time may be provided by an ACR component. The client compares the current media time with cues in the timeline information provided by the server. When the client finds a cue in the timeline matching the media time, the client may play the supplementary content associated with the cue. When communicating using a session, once the client has completed playback of the entire timeline (e.g., the primary content playback is complete and/or there is no more supple-mental content), the client may provide the server with a notification that the timeline has completed. The client may then provide a request to end the session, which may cause the server to terminate the session.

As previously discussed, the configuration file may provide configuration settings describing how often a timeline should be refreshed (e.g., how often the client should look for changes to the supplemental content). Based upon a configured refresh interval, the client may provide a request for the server to refresh the client's timeline information. Upon receiving the request, the server may: generate a new session, update information in the client's configuration file, create additional timelines, delete existing timelines, add, remove, and/or modify additional cues and/or supplemental content to an existing timeline, or perform no modifications to the timeline information. Further, if at any time, a new primary content identifier is encountered (e.g., playback is switched to new primary content, the process 66 may be repeated for the new primary content.

In some embodiments, it may be beneficial to note user interaction with the client. In certain embodiments, client control information and/or interaction with the supplemental content may be sent with one or more communications with the external server. In some embodiments, the analytic information may be useful to provide more relevant primary and/or supplemental content to a user or set of users.

It may be desirable to provide control information, such as volume control, mute/unmute, play, pause, rewind, and fast forward, to the external server, as such information may be very useful. For example, control information may indicate preferences of a user and/or set of users. In one example, control information relating to decreased volume, mute, and/or fast forward being activated at a particular time, may provide an indication of a user's disinterest in a particular piece of content. Further, activation of increased volume, unmute, and/or replay (via a rewind) may indicate an increased user interest in a particular piece of content. In addition to control information, analytic information relating to user interaction with the supplemental content may also be beneficial. For example, the supplemental content may provide a question or request interaction from a user. As will be discussed in more detail below, analytics may provide an indication of the user's interaction with the content.

Figure 7:
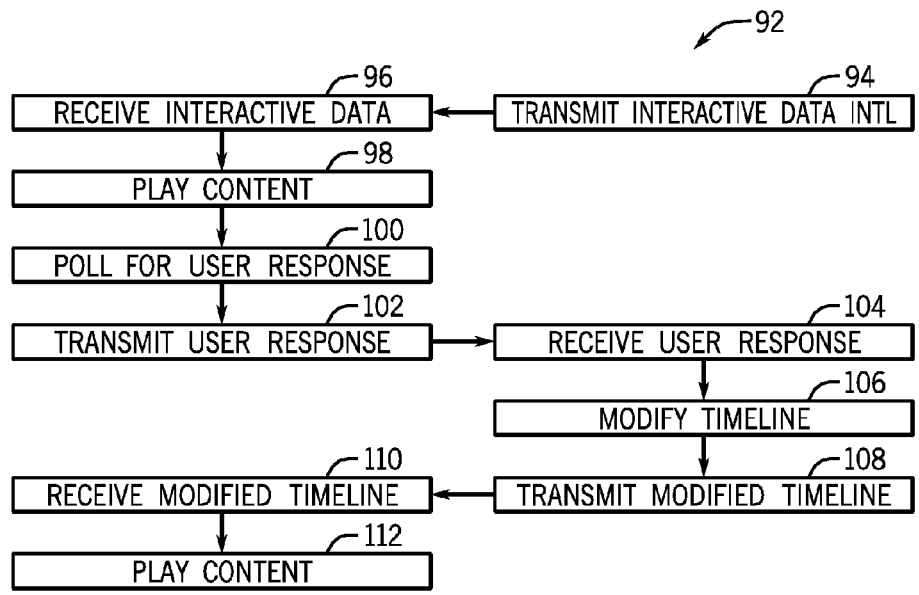
FIG. 7 is a single diagrammatical representation of a process for the delivery of interactive content.

FIG. 7 is a flowchart illustrating a process 92 for playing interactive content (e.g., events requesting user interaction) on a client (e.g., the media device 12). The process begins much like the process 66 of FIG. 6. The content data is determined and sent to an external server (e.g., supplementary content provider 36) and the configuration file is retrieved. The external server receives the content data and creates a timeline based upon the content data. However, in this embodiment, the timeline includes objects with a call to action by the client user. For example, in some embodiments, such objects may include polling (e.g., a question without a correct answer), trivia questions (e.g., a question with a correct answer), chat (e.g., textual communications with others), check-ins (e.g., a service that allows users to post the television shows they are watching), and/or e-commerce transactions (e.g., purchasing transactions through the client). The timeline with the interactive content is transmitted to the client (block 94) where it is received by the client (block 96). The content is played according to the timeline constraints (block 98).

When interactive content is played, the client may poll for a user response (block 100). The configuration file may include a setting that provides the frequency that such polling should occur. Further, the configuration file may include a setting that determines the duration that interactive content should be played when there is no user response. For example, the configuration file may set a 3 minute time limit, where the interactive content will remain in play mode for 3 minutes. After 3 minutes is up, if no user interaction has been detected, the client may hide the interactive content.

When a user does provide a user response, the client may transmit the user response (block 102) to the external server (e.g., supplementary content provider 36). The external server receives the user response (block 104) and may modify the timeline (block 106) based upon the user response. For example, the external server may modify the timeline to insert results for a poll and/or trivia question. The modified timeline is transmitted (block 108) back to the client, where it is received (block 110). The client plays the content (block 112) based upon the modified timeline. For example, the polling results and/or trivia question results may be displayed to the user.

Figure 8:
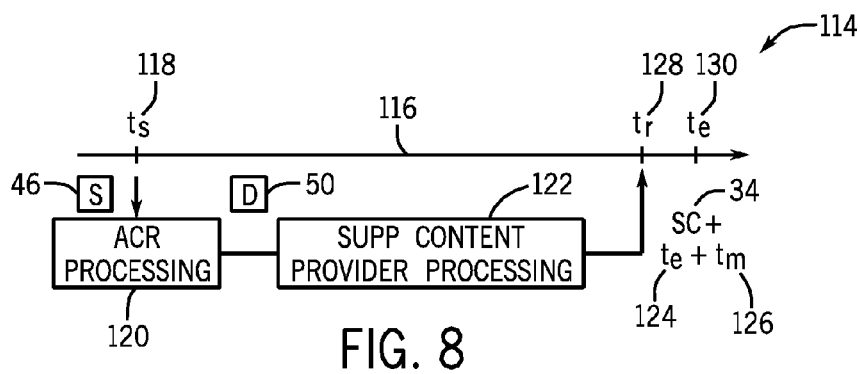
FIG. 8 is a time progression illustrating a presently contemplated technique synchronizing supplementary content with primary content based upon primary content sampling.
Figure 9:
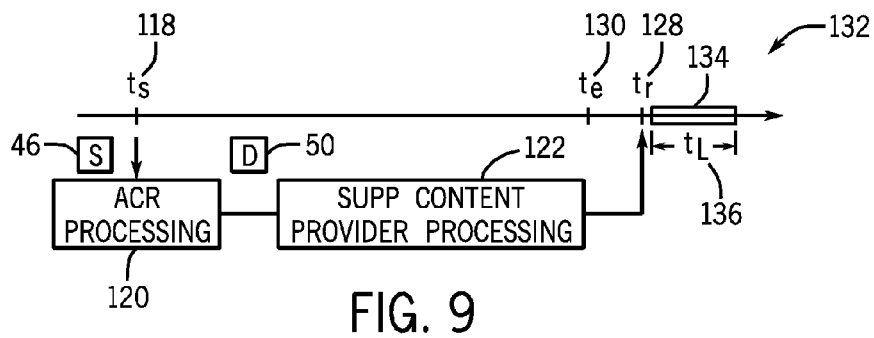
FIG. 9 is a similar time progression illustrating the synchronization of supplementary content with primary content.
Figure 10:
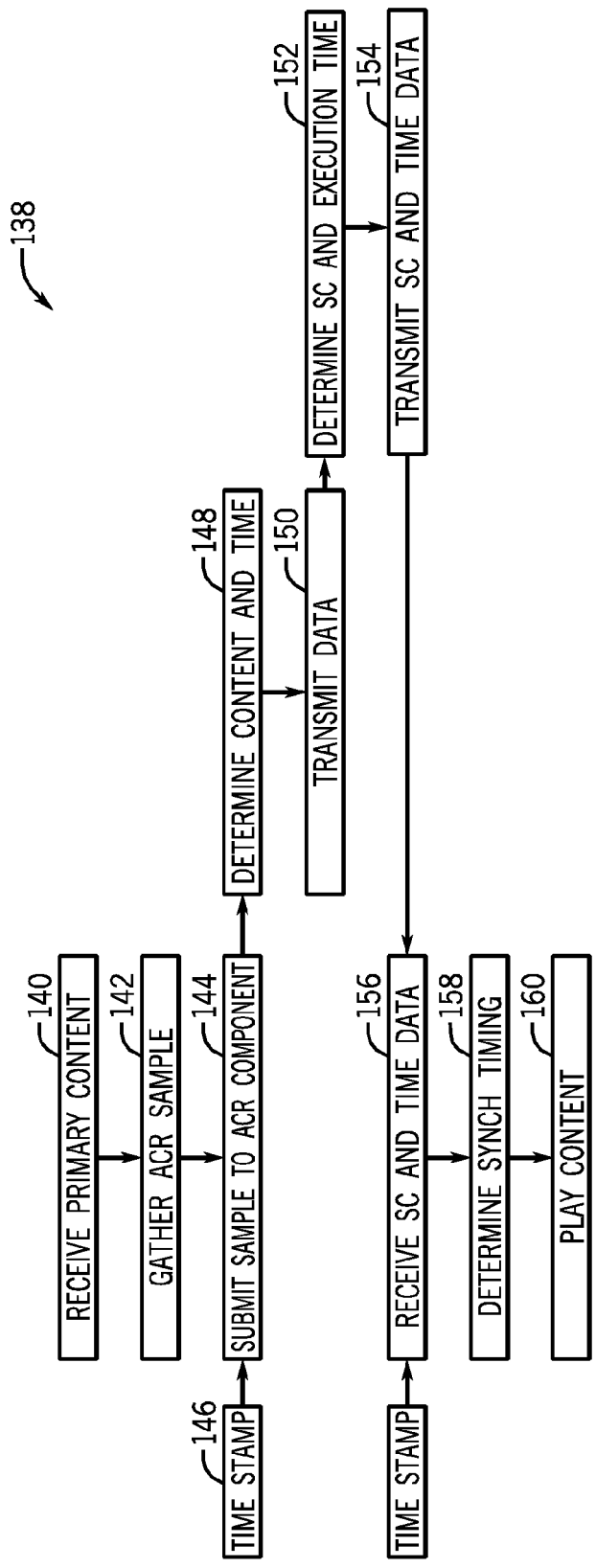
FIG. 10 is a diagrammatical representation of a synchronization process that may be used to synchronize supplementary content with primary content.

FIGS. 8 and 9 illustrate timelines 114 and 132 for playing supplementary content on a client (e.g., media device 12) at a particular media time 116. FIG. 8 illustrates a timeline 114 where the execution time of the supplementary content occurs after ACR and supplementary content processing has occurred. FIG. 9 illustrates a timeline 132 where the execution time occurs before the ACR and supplementary content processing has occurred. FIG. 10 illustrates a flow chart describing a process 138 for determining the proper time for supplementary content playback on the client. For clarity, FIGS. 8-10 will be discussed together. As previously discussed, the primary content is received at the client (block 140) and a sample 46 is taken (block 142). The sample is transmitted to the ACR components and/or ACR coordinator (block 144) for ACR processing 120 at time ts 118. A time stamp 146 representative of time ts is taken and stored at the client. The ACR processing 120 determines the media content and media time of the sample (block 148). Upon completion of the ACR processing 120, data 50 (including the content identity and media time of the sample 46) is transmitted to a supplementary content provider for supplementary content provider processing 122 (block 150). During supplementary content provider processing 122, the supplementary content and execution times associated with the content data 50 is determined (block 152). The supplementary content 34 and timeline with execution or playback times te 130 is transmitted back to the client (block 154) along with the sample media time tm 126. At time tr 128, the timeline and supplementary content is received by the client (block 156). A time stamp 146 representative of time tr 128 is taken and stored at the client.

Based upon the execution or playback times te 130 in the timeline, the sample media time tm 126, the transmission time ts 118, and the receive time tr 128, the client may determine the current media time and/or execution time for the supplementary content 34 (block 158). The processing time may be determined by subtracting the time stamp 146 representing tr 128 by the time stamp 146 representing ts 118. For example, if the sample 46 is sent at 12:00 PM and the supplementary content 34 is received back at 12:01 PM, tr 128=12:01 PM and ts 118=12:00 PM. Through subtraction, the processing time may be determined as 1 minute. The current media time may be determined by adding the processing time to the sample media time tm 126. For example, if the ACR processing 120 determines that the sample media time was 32 minutes, by adding the processing time of 1 minute, the current media time at tr 128 may be determined as 33 minutes.

It may be important to note that not all embodiments may utilize the current media time to determine when supplementary content 34 should be played. For example, in alternative embodiments, the supplementary content provider processing 122 may provide execution times based upon the sample media time tm 126. Based upon the execution time and the current media time (or the sample media time tm 126 and an incremental execution time), the content may be played at the execution time (block 160). For example, in embodiments where the current media time is the execution time reference, the execution time may be provided based upon the content media time where the supplementary content should be executed (e.g., te 130=Content Media time 37 minutes). Alternatively, in embodiments where the sample media time tm 126 is the reference, the execution time may be provided as an increment of the sample media time (e.g., te 130=Sample media time tm 126 (e.g., 32 minutes)+5 minutes). In either embodiment, the execution time te 130 would be 37 minutes. Upon reaching the execution time te 130 (e.g., 37th minute in the media content), the client plays the content (block 160).

As illustrated in FIG. 9, in certain situations, the execution time te 130 may occur before the processing 120 and 122 returns the supplementary content at time tr 128. In some embodiments, when the execution time tl 130 occurs prior receiving the supplementary content 34, the supplementary content 34 is not displayed. However, in alternative embodiments, the supplementary content 34 may be played for a durational window 34. In such embodiments, a duration time tl 136 may be provided in the timeline. The duration time tl 136 may provide an amount of time that the supplementary content should be played for before being removed (e.g., 5 minutes). When a duration time tl 136 is provided, the client may play the supplementary content 34 for the duration time tl 136, or in alternative embodiments play the supplementary content 34 for the duration of time that would occurred had the supplementary content been executed at execution time te 130. For example, if the execution time te 130 was 1 minute before the receive time tr 128 and the duration time tl 136 is 6 minutes, then the client may play the content starting at receive time tr 128 for 5 minutes (tl 136−(tr 128−te 130)).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for providing digital content, comprising:
  identifying primary digital content being played on a media device via data determined by an automatic content recognition component, wherein identifying the primary digital content by the automatic content recognition component comprises:
    obtaining a sample of primary digital content being played on a media device and identifying the primary digital content based upon the sample; and
  based upon the identification of the primary content, providing supplementary digital content to the media device.

2. The method of claim 1, wherein the automatic content recognition component is integrated into the media device.

3. The method of claim 1, wherein the automatic content recognition component is separate from the media device but local to the media device.

4. The method of claim 1, wherein the automatic content recognition component is remote from the media device.

5. The method of claim 1, wherein the automatic content recognition component derives a digital watermark from the primary digital content.

6. The method of claim 1, wherein the automatic content recognition component derives a digital signature from the primary digital content.

7. The method of claim 1, wherein the supplementary digital content is provided for play on the media device in synchronization with the primary digital content.

8. The method of claim 7, wherein synchronization of the supplementary digital content with the primary digital content is based upon a time at which sample of the primary digital content is taken for identification by the automatic content recognition component.

9. The method of claim 1, comprising selecting a layout for the supplementary digital content based upon a hardware platform and/or a configuration of the media device.

10. The method of claim 1, comprising selecting one of a plurality of available object types for the supplementary digital content.

11. The method of claim 1, comprising selecting one of a plurality of available event types for the supplementary digital content.

12. The method of claim 1, wherein the supplementary digital content calls for a response from the media device user, and wherein the supplementary digital content is changed based upon the response.

13. A system for providing digital content, comprising:
an automatic content recognition component configured to identify primary digital content being played on a media device based upon a sample of the primary content;
a supplementary digital content delivery system configured to transmit secondary digital content based upon the identification of the primary digital content.

14. The system of claim 13, wherein the automatic content recognition component is integrated into the media device.

15. The system of claim 13, wherein the automatic content recognition component is separate from the media device but local to the media device.

16. The system of claim 13, wherein the automatic content recognition component is remote from the media device.

17. The system of claim 13, wherein the automatic content recognition component derives a digital watermark from the primary digital content.

18. The system of claim 13, wherein the automatic content recognition component derives a digital signature from the primary digital content.

19. The system of claim 13, wherein the supplementary digital content is provided for play on the media device in synchronization with the primary digital content.

20. The system of claim 7, wherein synchronization of the supplementary digital content with the primary digital content is based upon a time at which sample of the primary digital content is taken for identification by the automatic content recognition component.

21. A system for providing digital content, comprising:
a content sampling component configured to obtain a sample of primary digital content being played on a media device;
a content identification component configured to derive unique identifying data from the sample;
an automatic content recognition component configured to identify the primary digital content based upon the identifying data; and
a supplementary digital content delivery system configured to transmit secondary digital content based upon the identification of the primary digital content.

22. The system of claim 21, wherein the supplementary digital content delivery system is configured to select a layout for the supplementary digital content based upon a hardware platform and/or a configuration of the media device.

23. The system of claim 21, wherein the supplementary digital content delivery system is configured to select one of a plurality of available object types for the supplementary digital content.

24. The system of claim 21, wherein the supplementary digital content delivery system is configured to select one of a plurality of available event types for the supplementary digital content.

25. The system of claim 21, wherein the supplementary digital content calls for a response from the media device user, and wherein the supplementary digital content delivery system changes the supplementary digital content based upon the response.

26. A computer implemented method executable based upon code stored on at least one non-volatile computer memory device, the method comprising:
identifying primary digital content being played on a media device by an automatic content recognition component that:
obtains a sample of primary digital content being played on a media device and identifies the primary digital content based upon the sample; and
based upon the identification of the primary content, providing supplementary digital content to the media device.

27. The method of claim 26, comprising selecting a layout for the supplementary digital content based upon a hardware platform and/or a configuration of the media device.

28. The method of claim 26, comprising selecting one of a plurality of available object types for the supplementary digital content.

29. The method of claim 26, comprising selecting one of a plurality of available event types for the supplementary digital content.

30. A computer implemented method executable based upon code stored on at least one non-volatile computer memory device, the method comprising:
determining a platform and/or configuration of a media device playing primary digital content;
selecting at least one of a layout, an object type and an event type for supplementary digital content to be provided to the media device based upon identification of the primary digital content obtained through analysis of a playback sample of the primary digital content; and
transmitting the supplementary digital content based upon the selected layout, object type and/or event type.

31. The method of claim 30, wherein a layout is selected based upon a desired overlay area for the supplementary digital content on the primary digital content.

32. The method of claim 30, wherein an object type is selected that comprises interaction with a user of the media device.

* * * * *